United States Patent
Park et al.

(10) Patent No.: US 11,630,574 B2
(45) Date of Patent: Apr. 18, 2023

(54) SCREEN CONTROL METHOD FOR PROVIDING NOTIFICATION OF OBJECTS HAVING DIFFERENT MEANINGS FOR EACH REGION AND ELECTRONIC DEVICE SUPPORTING SAME

(71) Applicant: Samsung Electronics Co., Ltd., Gyeonggi-do (KR)

(72) Inventors: Miji Park, Gyeonggi-do (KR); Younghak Oh, Gyeonggi-do (KR)

(73) Assignee: Samsung Electronics Co., Ltd

( * ) Notice: Subject to any disclaimer, the term of this patent is extended or adjusted under 35 U.S.C. 154(b) by 39 days.

(21) Appl. No.: 16/962,775

(22) PCT Filed: Mar. 18, 2019

(86) PCT No.: PCT/KR2019/003085
§ 371 (c)(1),
(2) Date: Jul. 16, 2020

(87) PCT Pub. No.: WO2019/177437
PCT Pub. Date: Sep. 19, 2019

(65) Prior Publication Data
US 2020/0356268 A1 Nov. 12, 2020

(30) Foreign Application Priority Data
Mar. 16, 2018 (KR) .................. 10-2018-0030734

(51) Int. Cl.
*G06F 3/04886* (2022.01)
*G06V 40/16* (2022.01)
(52) U.S. Cl.
CPC ........ *G06F 3/04886* (2013.01); *G06V 40/166* (2022.01); *G06V 40/176* (2022.01)

(58) Field of Classification Search
CPC ...... G06F 3/04886; G06F 1/163; G06F 3/011; G06F 40/30; G06F 3/0481; G06F 9/454;
(Continued)

(56) References Cited

U.S. PATENT DOCUMENTS

| 7,451,188 B2 | 11/2008 | Cheung et al. |
| 7,574,332 B2 | 8/2009 | Ballin et al. |

(Continued)

FOREIGN PATENT DOCUMENTS

| JP | 2010146563 | 7/2010 |
| JP | 2016-005017 | 1/2016 |

(Continued)

OTHER PUBLICATIONS

European Search Report dated Feb. 11, 2021 issued in counterpart application No. 19767629.9-1231, 8 pages.
(Continued)

*Primary Examiner* — David D Davis
(74) *Attorney, Agent, or Firm* — The Farrell Law Firm, P.C.

(57) ABSTRACT

Disclosed is an electronic device including a display, a memory, and a processor. The processor is configured to identify a first region set for the electronic device, to identify a second region associated with a first object output to the display, to determine whether the first region is different from the second region, to identify a first meaning of which a second object output to the display is used in the first region and a second meaning of which the second object is used in the second region when the second region is different from the first region, to determine whether the first meaning is different from the second meaning, and to provide a notification that the first meaning is different from the second meaning, through the display when the first meaning
(Continued)

is different from the second meaning. Other various embodiments as understood from the specification are also possible.

13 Claims, 11 Drawing Sheets

(58) Field of Classification Search
CPC ...... G06F 2203/04804; G06K 9/00255; G06K 9/00315; G06K 9/00; G06K 9/00221; H04L 51/04; G10L 15/00; G10L 15/02; G10L 15/005
See application file for complete search history.

(56) References Cited

U.S. PATENT DOCUMENTS

| | | | |
|---|---|---|---|
| 8,739,031 | B2 | 5/2014 | Cheung et al. |
| 8,923,572 | B2 | 12/2014 | In et al. |
| 9,323,854 | B2 | 4/2016 | Massuh |
| 9,429,447 | B2 | 8/2016 | Son et al. |
| 10,095,918 | B2 | 10/2018 | Gil et al. |
| 2006/0167992 | A1* | 7/2006 | Cheung ................ G06F 40/169 709/204 |
| 2006/0184355 | A1 | 8/2006 | Ballin et al. |
| 2007/0143410 | A1* | 6/2007 | Kraft .................... G06Q 10/107 709/206 |
| 2008/0313534 | A1 | 12/2008 | Cheung et al. |
| 2010/0161311 | A1* | 6/2010 | Massuh ............... G06F 16/9537 704/7 |
| 2014/0289604 | A1 | 9/2014 | Cheung et al. |
| 2016/0323213 | A1* | 11/2016 | Hong .................... H04L 51/066 |
| 2016/0352887 | A1* | 12/2016 | Na .................... H04M 1/72436 |
| 2017/0004356 | A1 | 1/2017 | Gil et al. |

FOREIGN PATENT DOCUMENTS

| | | |
|---|---|---|
| JP | 2016143289 | 8/2016 |
| KR | 1020100094021 | 8/2010 |
| KR | 1020130020065 | 2/2013 |
| KR | 1020130083049 | 7/2013 |
| KR | 1020150141419 | 12/2015 |

OTHER PUBLICATIONS

PCT/ISA/210 Search Report issued on PCT/KR2019/003085, dated Jul. 2, 2019, pp. 5.
PCT/ISA/237 Written Opinion issued on PCT/KR2019/003085, dated Jul. 2, 2019, pp. 5.
Korean Office Action dated Sep. 6, 2022 issued in counterpart application No. 10-2018-0030734, 14 pages.

* cited by examiner

SCREEN CONTROL METHOD FOR PROVIDING NOTIFICATION OF OBJECTS HAVING DIFFERENT MEANINGS FOR EACH REGION AND ELECTRONIC DEVICE SUPPORTING SAME

PRIORITY

This application is a National Phase Entry of PCT International Application No. PCT/KR2019/003085 which was filed on Mar. 18, 2019, and claims priority to Korean Patent Application No. 10-2018-0030734, which was filed on Mar. 16, 2018, the content of each of which is incorporated herein by reference.

STATEMENT REGARDING FEDERALLY SPONSORED APPLICATIONS

Not Applicable.

THE NAMES OF THE PARTIES TO A JOINT RESEARCH AGREEMENT

Not Applicable.

INCORPORATION-BY-REFERENCE OF MATERIAL SUBMITTED ON A READ-ONLY OPTICAL DISC, AS A TEXT FILE OF AN XML FILE VIA THE PATENT ELECTRONIC SYSTEM

Not Applicable.

STATEMENT REGARDING PRIOR DISCLOSURES BY THE INVENTOR OF A JOINT INVENTOR

Not Applicable.

BACKGROUND OF THE INVENTION

1. Field of the Invention

The embodiments disclosed in this specification relate to a technology for controlling a screen.

2. Description of Related Art

An electronic device such as a smart phone may support various methods for communicating with users in different regions (or countries or cultures). For example, the electronic device may provide an environment for transmitting and receiving messages with other users through a message application, an email application, or a chat application (e.g., instant messenger (IM) application). Besides, the electronic device may transmit and receive messages including images, audio, or video as well as texts. For example, the electronic device may support transmitting/receiving emoticons, stickers, audio, videos, or the like.

In the meantime, a wearable electronic device that is able to be directly mounted on a body of a user is being widely supplied. The wearable electronic device may be used while being mounted on a part of the body, for example, a wrist, ankle, neck, waist, or head, thereby improving mobility and portability. A head-mounted display apparatus (HMD), smart glasses, or the like mounted on a user's head and displaying an image may be included as an example of a wearable electronic device. The wearable electronic device may provide a virtual reality (VR) environment or an augmented reality (AR) environment for communication with users in other regions.

The electronic device that provides an environment for communication with users in other regions may provide a translation function. For example, the electronic device may provide a function of translating a text transmitted and received such that communication between users utilizing different languages may be smoothly made.

However, the conventional electronic device only provides a function of translating texts; on the other hand, and transmits/receives an object capable of having a different meaning for each region (alternatively, country or culture) without going through a separate process. For example, the conventional electronic device may display images indicating emoticons, stickers, or gestures that are capable of having different meanings for each region as it is, in a state where they are received from external electronic devices utilized by users in other regions or may transmit the images to the external electronic device as it is. In this case, messages of different meanings may be exchanged.

The embodiments disclosed in this specification may provide a screen control method for providing a notification on objects having different meanings for each region, and an electronic device supporting the same.

BRIEF SUMMARY OF THE INVENTION

The disclosure has been made to address at least the above-mentioned problems and/or disadvantages and to provide at least the advantages described below.

An aspect of the disclosure provides an electronic device that includes a display, a memory, and a processor. The processor is configured to identify a first region set for the electronic device; to identify a second region associated with a first object output to the display; to determine whether the first region is different from the second region; to identify a first meaning of which a second object output to the display is used in the first region and a second meaning of which the second object is used in the second region when the second region is different from the first region; to determine whether the first meaning is different from the second meaning; and to provide a notification that the first meaning is different from the second meaning, through the display when the first meaning is different from the second meaning.

Another aspect of the disclosure provides a screen controlling method of an electronic device that includes identifying a first region set for the electronic device; identifying a second region associated with a first object output to a display; determining whether the first region is different from the second region; when the second region is different from the first region, identifying a first meaning of which a second object output to the display is used in the first region and a second meaning of which the second object is used in the second region; determining whether the first meaning is different from the second meaning; and providing a notification that the first meaning is different from the second meaning, through the display when the first meaning is different from the second meaning.

According to the embodiments disclosed in this specification, it is possible to support more accurate communication with users in different regions by providing a notification on objects having different meanings for each region.

Besides, a variety of effects directly or indirectly understood through the disclosure may be provided.

BRIEF DESCRIPTION OF THE SEVERAL VIEWS OF THE DRAWINGS

The above and other aspects, features, and advantages of certain embodiments will be more apparent from the following description taken in conjunction with the accompanying drawings, in which.

With regard to description of drawings, the same or similar components may be marked by the same or similar reference numerals.

DETAILED DESCRIPTION OF THE INVENTION

Figure 1:
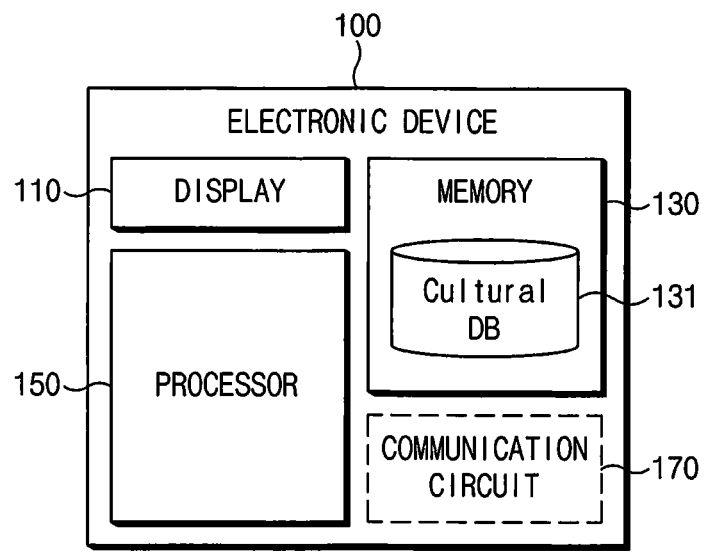
FIG. 1 is a block diagram of an electronic device associated with screen control according to an embodiment.

FIG. 1 is a block diagram of an electronic device associated with screen control according to an embodiment.

According to an embodiment, an electronic device 100 (e.g., an electronic device 1101 of FIG. 11) may provide a translation function such that a user of the electronic device 100 may communicate smoothly with a user (hereinafter referred to as a "counterpart") in another region (alternatively, country or culture). For example, the electronic device 100 may provide a translation function to a message application, an email application, or a chat application. Besides, the electronic device 100 may provide a user with a notification on an object capable of having a different meaning for each region (alternatively, country or culture). For example, the electronic device 100 may provide a notification on emoticons or stickers capable of having different meanings for each region. For another example, the electronic device 100 may provide a notification on an image indicating a gesture capable of having a different meaning for each region. Furthermore, the electronic device 100 may process the object to prevent the object from being used or may change the object into another object.

Figure 11:
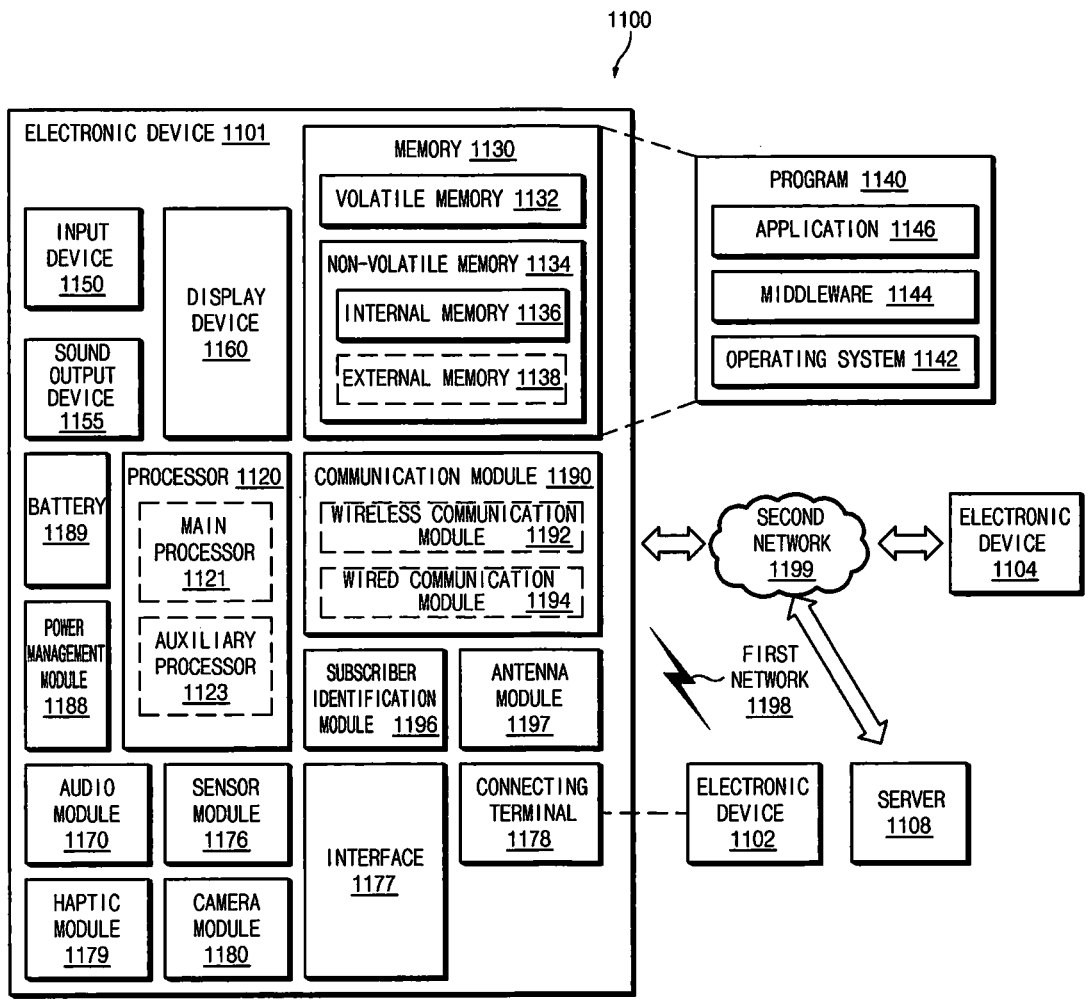
FIG. 11 is a block diagram of an electronic device in a network environment, according to various embodiments.

Referring to FIG. 1, the electronic device 100 performing the above-described function may include a display 110 (e.g., at least part of a display device 1160 of FIG. 11), a memory 130 (e.g., a memory 1130 of FIG. 11), and a processor 150 (e.g., a processor 1120 of FIG. 11). However, a configuration of the electronic device 100 is not limited thereto. According to various embodiments, the electronic device 100 may further include at least another component in addition to the aforementioned components. For example, the electronic device 100 may further include a communication circuit 170 (e.g., at least part of a communication module 1190 of FIG. 11).

The display 110 may display various content (e.g., texts, images, video, icons, symbols, or the like) to a user. According to an embodiment, the display 110 may include a touch screen. For example, the display 110 may obtain a touch, gesture, proximity, or a hovering input using an electronic pen or a part of the user's body (e.g., a finger).

The memory 130 may store a command or data associated with at least another component of the electronic device 100. According to an embodiment, the memory 130 may store software and/or a program. For example, the memory 130 may store an application (e.g., a message application, an email application, a chat application, or the like) for communicating with a counterpart. The instructions included in software and/or programs stored in the memory 130 may be executed by the processor 150.

According to an embodiment, the memory 130 may store a cultural database (DB) 131. The cultural DB 131 may include information about objects (e.g., emoticons, stickers, gestures, and the like) having different meanings for each region (alternatively, country or culture).

The processor 150 may perform data processing or an operation associated with control and/or communication of at least one other element(s) of the electronic device 100. The processor 150 may drive an operating system (OS) or an application program to control a plurality of hardware or software components connected to the processor 150 and may process and compute a variety of data. The processor 150 may include one or more of a central processing unit, an application processor, or a communication processor. According to an embodiment, the processor 150 may be implemented with a system-on-chip (SoC).

According to an embodiment, the processor 150 may identify a region set in the electronic device 100. For example, the processor 150 may identify configuration information associated with a region of the electronic device 100. For another example, the processor 150 may identify a region of the electronic device 100 through profile information (or account information) of a user of the electronic device 100.

According to an embodiment, the processor 150 may identify a region associated with an object output to the display 110. For example, the processor 150 may identify a region associated with an object included in an execution screen such as a message application, an email application, or a chat application. For another example, the processor 150 may identify a region associated with an object included in a VR image or an AR image. The object may be an object associated with a counterpart that is a communication target. For example, the object may include information (e.g., a name, a nickname, an account ID, a phone number, or the like) capable of identifying a counterpart. For another example, the object may include an image obtained by capturing a counterpart.

According to an embodiment, when the object includes information capable of identifying the counterpart, the processor 150 may identify the region of the counterpart, using the information. For example, the processor 150 may identify the region of the counterpart, using the counterpart's name, nickname, account ID, phone number, or the like.

According to an embodiment, when the object includes an image of counterpart, the processor 150 may analyze the image, may recognize the face of the counterpart based on the analyzed information, may identify the counterpart through the recognized information, and may identify the region of the counterpart, using profile information of the identified counterpart. Alternatively, the processor 150 may determine the facial feature of the counterpart based on the information from analyzing the image and may determine (infer) the region of the counterpart through the facial feature. Alternatively, the processor 150 may analyze the voice information included in the image, may recognize the counterpart's voice based on the analyzed information, may identify the counterpart, and may identify the counterpart's region using the identified counterpart's profile information. Alternatively, the processor 150 may determine (infer) the region of the counterpart, through the language or linguistic features (e.g., intonation, or the like) used by the counterpart based on the information from analyzing the voice.

According to an embodiment, the processor 150 may identify the meaning used for each region by the object output to the display 110. For example, the processor 150 may identify the meaning used for each region by an image indicating an emoticon, a sticker, or a gesture output to the display 110. The meaning in the case where the object is used for each region may be managed through the cultural DB 131 stored in the memory 130.

According to an embodiment, when objects with different meanings for each region are displayed on the display 110, the processor 150 may notify the user that the object has different meanings for each region. For example, the processor 150 may output texts, images, or the like indicating that the object has different meanings for each region, on the display 110.

According to an embodiment, the processor 150 may process an object having a different meaning for each region to prevent the object from being used. For example, the processor 150 may restrict the selection input to the object to prevent the object from being used. For example, even though the user selects the object, the processor 150 may ignore the touch input as if the object were not selected. For another example, the processor 150 may control the screen to prevent the object from being used. For example, the processor 150 may delete or transparently process the object such that the object is not visible on a screen.

According to an embodiment, the processor 150 may change an object having a different meaning for each region into another object. For example, when the first object has the first meaning in the first region and has the second meaning in the second region, the processor 150 may display the first object as it is to the user in the first region, and may change the first object to the second object having the first meaning to display the second object to a user in the second region.

The communication circuit 170 may support the communication channel establishment between the electronic device 100 and an external electronic device and the execution of wired or wireless communication through the established communication channel.

As described above, according to various embodiments, an electronic device (e.g., the electronic device 100) may include a display (e.g., the display 110), a memory (e.g., the memory 130), and a processor (e.g., the processor 150). The processor may be configured to identify a first region set for the electronic device, to identify a second region associated with a first object output to the display, to determine whether the first region is different from the second region, to identify a first meaning of which a second object output to the display is used in the first region and a second meaning of which the second object is used in the second region when the second region is different from the first region, to determine whether the first meaning is different from the second meaning, and to provide a notification that the first meaning is different from the second meaning, through the display when the first meaning is different from the second meaning.

According to various embodiments, the memory may store information about at least one object having a different meaning for each region.

According to various embodiments, the processor may include identifying the information stored in the memory as at least part of the identifying of the first meaning and the second meaning.

According to various embodiments, as at least part of the identifying of the first region, the processor may identify the first region based on at least one of configuration information of the electronic device and profile information about a user of the electronic device.

According to various embodiments, as at least part of the identifying of the second region, when the first object includes identification information of a counterpart, the processor may identify the second region, using the identification information.

According to various embodiments, as at least part of the identifying of the second region, when the first object includes an image obtained by capturing a counterpart, the processor may analyze the image, may recognize a face of the counterpart based on the analyzed information, may identify the counterpart through the recognized information, and may identify the second region, using profile information of the identified counterpart.

According to various embodiments, as at least part of the identifying of the second region, when the first object includes an image obtained by capturing a counterpart, the processor may analyze the image, may determine a facial feature of the counterpart based on the analyzed information, and may determine the second region through the facial feature.

According to various embodiments, as at least part of the identifying of the second region, when the first object includes a voice of a counterpart, the processor may analyze the voice, may recognize the voice of the counterpart based on the analyzed information, may identify the counterpart through the recognized information, and may identify the second region, using profile information of the identified counterpart.

According to various embodiments, as at least part of the identifying of the second region, when the first object includes a voice of a counterpart, the processor may analyze the voice, may determine at least one of a language or a linguistic feature used by the counterpart based on the analyzed information, and may determine the second region through the at least one of the language or the linguistic feature.

According to various embodiments, as at least part of the providing of the notification, the processor may output at least one of a text and an image indicating that the first meaning is different from the second meaning, to the display.

According to various embodiments, the processor may change the second object to a third object indicating usage restriction of the second object or may transparently process the second object.

According to various embodiments, the processor may ignore a touch input to the second object.

According to various embodiments, the processor may change the second object to a third object having the second meaning.

According to various embodiments, the electronic device may further include a communication circuit communicating with an external electronic device of the second region. When receiving a user input to transmit the second object to the external electronic device through the communication circuit, the processor may change the second object to a third object having the second meaning and may transmit the third object to the external electronic device.

Figure 2:
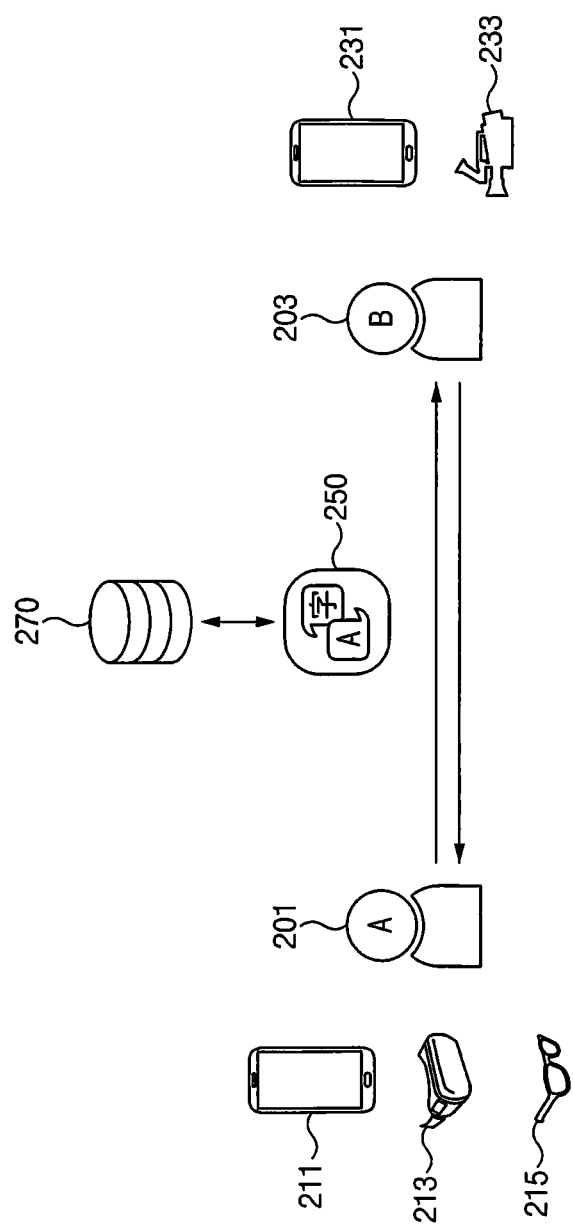
FIG. 2 is a view for describing a method of communicating between users of different regions according to an embodiment.

FIG. 2 is a view for describing a method of communicating between users of different regions according to an embodiment.

Referring to FIG. 2, a first user 201 may communicate with a second user 203 in another region (alternatively, country or culture) through an application 250 supporting a translation function.

According to an embodiment, the first user 201 may communicate with the second user 203 through a message application, an email application, or a chat application installed in an electronic device such as a smart phone 211. In this case, the second user 203 may also utilize an electronic device such as a smart phone 231.

According to an embodiment, the first user 201 may communicate with the second user 203 through a VR environment. For example, the first user 201 may identify the image captured by the second user 203 using a camera 233, through an HMD 213 or the like. Besides, the first user 201 may communicate with the second user 203 by providing the second user 203 with feedback on the image. Upon outputting the image and providing the feedback, the HMD 213 may notify the first user 201 of an object having a different meaning for each region through the translation function.

According to an embodiment, the first user 201 may communicate with the second user 203 through an AR VR environment. For example, the first user 201 may identify the second user 203 and an image including an object associated with the translation function, through smart glasses 215 or the like. For example, while actually talking to the second user 203 in another culture, the voice, gestures, or the like of the second user 203 may be analyzed; when the meaning of words or gestures of the second user 203 is different from the meaning in the culture of the first user 201, this may be provided to the first user 201.

Figure 3:
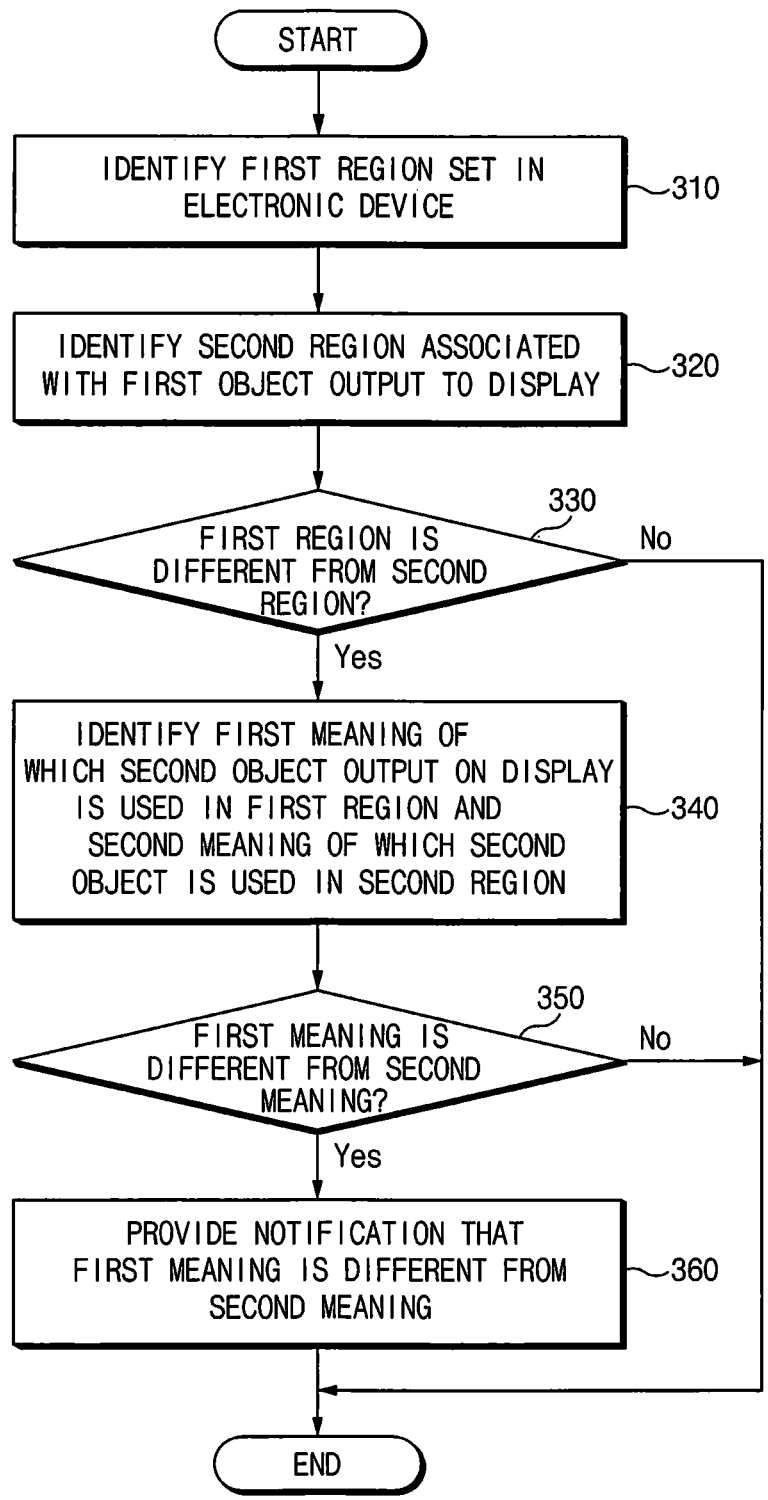
FIG. 3 is a diagram illustrating a method of operating an electronic device associated with screen control according to an embodiment.

FIG. 3 is a diagram illustrating a method of operating an electronic device associated with screen control according to an embodiment.

Referring to FIG. 3, in operation 310, a processor (e.g., the processor 150) of an electronic device (e.g., the electronic device 100) may identify a first region set in the electronic device. For example, the processor may identify configuration information associated with the first region in the memory of the electronic device (e.g., the memory 130). For another example, the processor may identify the first region through profile information (or account information) regarding the user of the electronic device.

In operation 320, the processor may identify the second region associated with the first object output to the display (e.g., the display (110)). For example, the processor may identify the second region associated with the first object included in the execution screen of the message application, email application, or chat application displayed on the display. For another example, the processor may identify the second region associated with the first object included in the VR image or AR image output on the display. Herein, the first object may be an object associated with the counterpart that is a communication target. For example, the first object may include information (e.g., a name, a nickname, an account ID, a phone number, or the like) capable of identifying a counterpart. For another example, the first object may include an image obtained by capturing a counterpart.

According to an embodiment, when the first object includes information capable of identifying the counterpart, the processor may identify the second region of the counterpart, using the information. According to an embodiment, when the first object includes an image obtained by capturing the counterpart, the processor may analyze the image, may recognize the face of the counterpart based on the analyzed information, and may identify the region of the counterpart or infer the second region of the counterpart through the facial features of the counterpart. Alternatively, the processor may analyze the voice information included in the image, may recognize the voice of the counterpart based on the analyzed information, may identify the region of the counterpart or infer the second region of the counterpart through the language or linguistic features (e.g., an accent, or the like) used by the counterpart.

In operation 330, the processor may determine whether the first region is different from the second region. For example, the processor may determine whether the first region of the user of the electronic device is different from the second region of the counterpart.

In operation 340, the processor may identify the first meaning of which the second object output on the display is used in the first region and the second meaning of which the second object is used in the second region. For example, the processor may identify the first meaning, of which the image indicating an emoticon, sticker, or gesture displayed on the display is used in the first region, and the second meaning of which the image is used in the second region. The meanings used by the second object for each region may be managed through a cultural DB (e.g., the cultural DB 131) stored in the memory.

In operation 350, the processor may determine whether the first meaning is different from the second meaning. For example, the processor may determine whether the first meaning of which the second object is used in the first region is different from the second meaning of which the second object is used in the second region.

In operation 360, the processor may notify the user that the first meaning is different from the second meaning. For example, when the second object having a different meaning for each region is displayed on the display, the processor may output texts, images, or the like indicating that the second object has different meanings for each region, on the display.

According to an embodiment, the processor may process the second object having a different meaning for each region to prevent the second object from being used. According to an embodiment, the processor may restrict the selection input to the second object to prevent the second object from being used. For another example, the processor may control the screen to prevent the second object from being used. For example, the processor may delete or transparently process the second object such that the second object is not visible on a screen.

According to an embodiment, the processor may change the second object having a different meaning for each region into another object. For example, the processor may change the second object to a third object used to have the first meaning in the second region.

As described above, according to various embodiments, a screen controlling method of an electronic device may include identifying a first region set for the electronic device, identifying a second region associated with a first object output to a display, determining whether the first region is different from the second region, when the second region is different from the first region, identifying a first meaning of which a second object output to the display is used in the first region and a second meaning of which the second object is used in the second region, determining whether the first meaning is different from the second meaning, and providing a notification that the first meaning is different from the second meaning, through the display when the first meaning is different from the second meaning.

According to various embodiments, the providing of the notification may include outputting at least one of a text and an image indicating that the first meaning is different from the second meaning, to the display.

According to various embodiments, the method may further include changing the second object to a third object indicating usage restriction of the second object or transparently processing the second object.

According to various embodiments, the method may further include ignoring a touch input to the second object.

According to various embodiments, the method may further include changing the second object to a third object having the second meaning.

According to various embodiments, the method may further include receiving a user input to transmit the second object to the external electronic device of the second region through a communication circuit, changing the second object to a third object having the second meaning, and transmitting the third object to the external electronic device.

Figure 4:
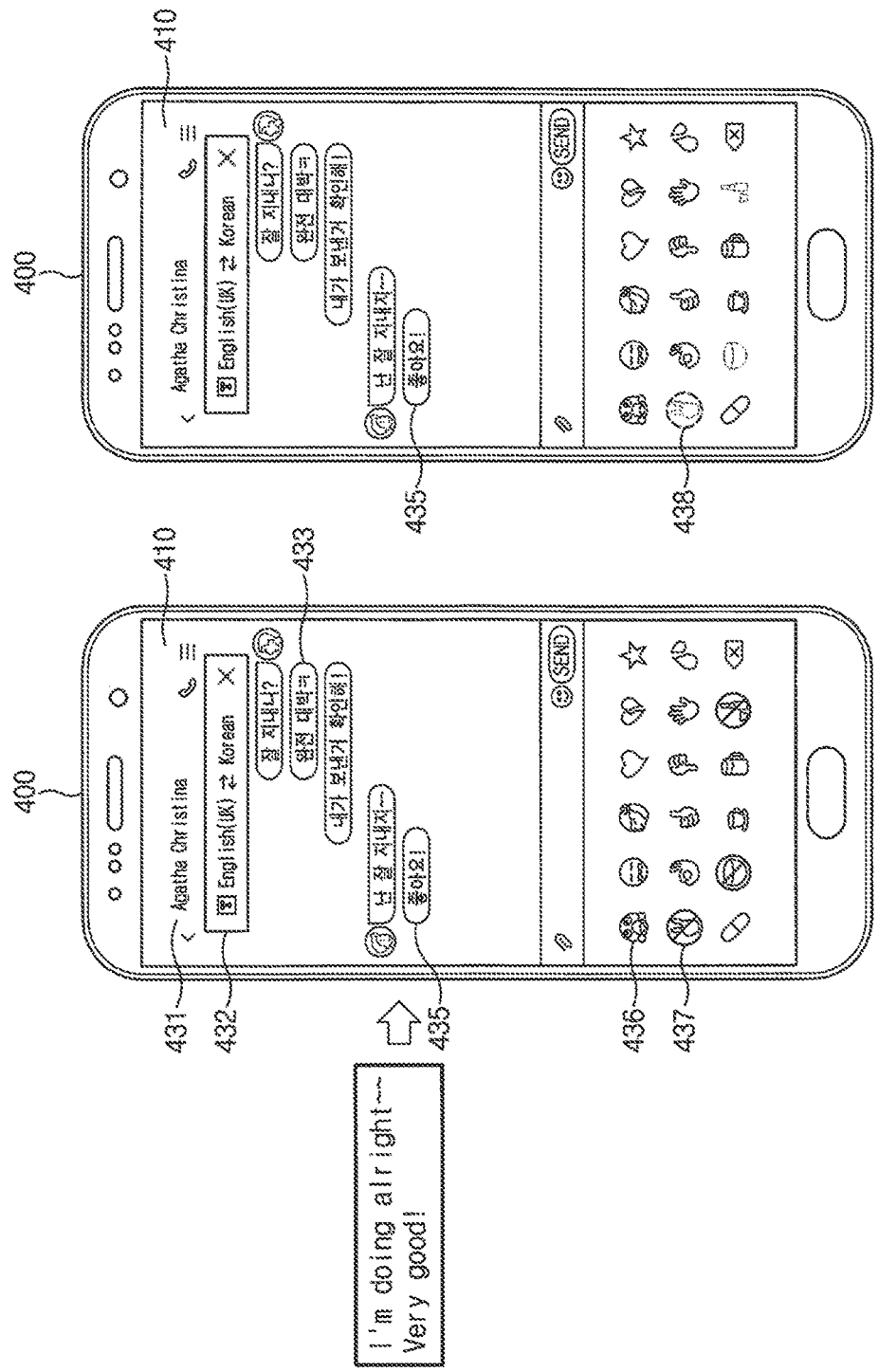
FIG. 4 is a view for explaining a method for prohibiting the use of objects having different meanings according to an embodiment.

FIG. 4 is a view for explaining a method for prohibiting the use of objects having a different meaning according to an embodiment.

Referring to FIG. 4, an electronic device 400 (e.g., the electronic device 100) may display an execution screen of a message application, an email application, a chat application, or the like that supports the communication with the counterpart, on a display 410 (e.g., the display 110). For example, the electronic device 400 may display a first object 431 including the identification information of the counterpart, conversation content 433 e.g., ' 잘 지내니 ?'='How are you?', ' 완전 대박ㅋ '='It was great', ' 내가 보낸거 확인해!'='See what I got for you!') transmitted by the user, content 434 (e.g., 'I'm doing alright~~', 'Very good!') obtained by translating conversation content 435 (e.g., ' 난 잘 내지~~', '좋아요 !') transmitted by the counterpart, or the like, on the display 410. Moreover, the electronic device 400 may support a translation function for smooth communication between users and counterparts of different regions and may output a second object 432 including translated language information to the display 410.

According to an embodiment, the electronic device 400 may identify a region associated with the first object 431 output to the display 410. The first object 431 may be an object associated with the counterpart that is a communication target. For example, the first object 431 may include information (e.g., a name, a nickname, an account ID, a phone number, or the like) capable of identifying a counterpart. In any embodiments, the electronic device 400 may identify the region of the counterpart, using the second object 432 associated with the translation function. For example, when the second object 432 includes language information of the counterpart, the electronic device 400 may determine the region of the counterpart, using the language information.

According to an embodiment, the electronic device 400 may control the screen of the display 410 to transmit emoticons, stickers, or the like in addition to texts. For example, the electronic device 400 may provide an interface for selecting emoticons, stickers, or the like, in the lower region of the screen of the electronic device 400.

According to an embodiment, the electronic device 400 may identify the meaning used for each region by the object such as an emoticon, a sticker, or the like output to the display 410 for each region. Besides, when the object such as an emoticon, a sticker, or the like has a different meaning for each region, the electronic device 400 may output a text, an image, or the like indicating that the object has different meanings for each region on the display 410.

According to an embodiment, the electronic device 400 may process an object having a different meaning for each region to prevent the object from being used. For example, the electronic device 400 may output the emoticon (e.g., a third object 436) having the same meaning regardless of region, to the display 410 as it is without any separate processing; as in the first state 401, the electronic device 400 may change an emoticon having a different meaning for each region to a fourth object 437 indicating the use restriction of the emoticon. For another example, as in the second state 403, the electronic device 400 may perform transparent processing 438 on an emoticon having a different meaning for each region.

According to an embodiment, the electronic device 400 may restrict a selection input to an object having a different meaning for each region. For example, even though the user selects the object, the electronic device 400 may ignore a touch input to the object as if the object were not selected.

Figure 5:
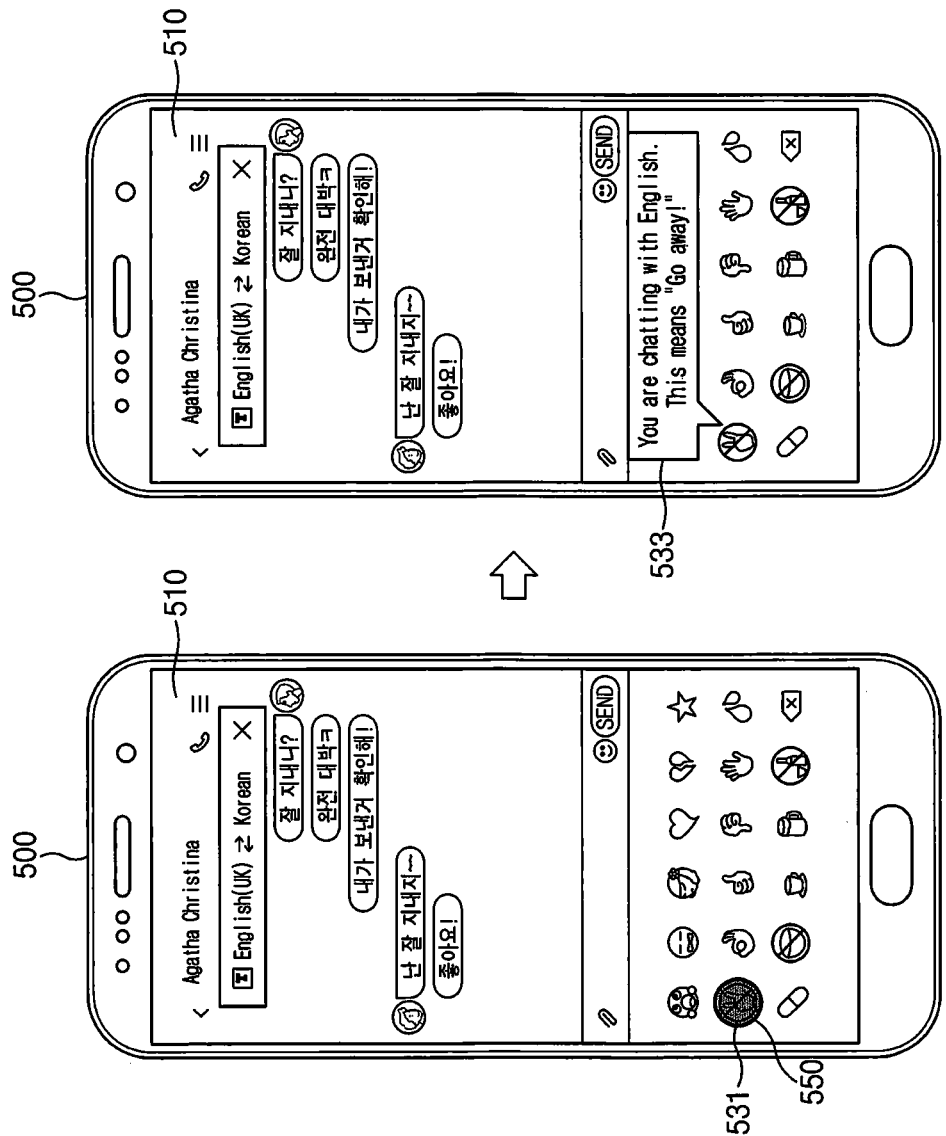
FIG. 5 is a view for describing a method of providing a notification of different meanings of an object according to an embodiment.

FIG. 5 is a view for describing a method of providing a notification of different meanings of an object according to an embodiment.

Referring to FIG. 5, when there is a first object having a different meaning for each region among the objects displayed on a display 510 (e.g., the display 110), an electronic device 500 (e.g., the electronic device 100) may provide a notification that the first object has a different meaning for each region.

According to an embodiment, when there is a first object having a different meaning for each region, the electronic device 500 may change the first object to a second object 531 indicating the usage restriction of the first object to output the second object 531 to the display 510.

According to an embodiment, when a user input 550 to select the second object 531 occurs, the electronic device 500 may output the third object 533 including the reason that the first object is restricted, on the display 510. For example, the electronic device 500 may output the third object 533 having the form of a speech bubble including the meaning of which the first object is used in another region, on the display 510.

Figure 6:
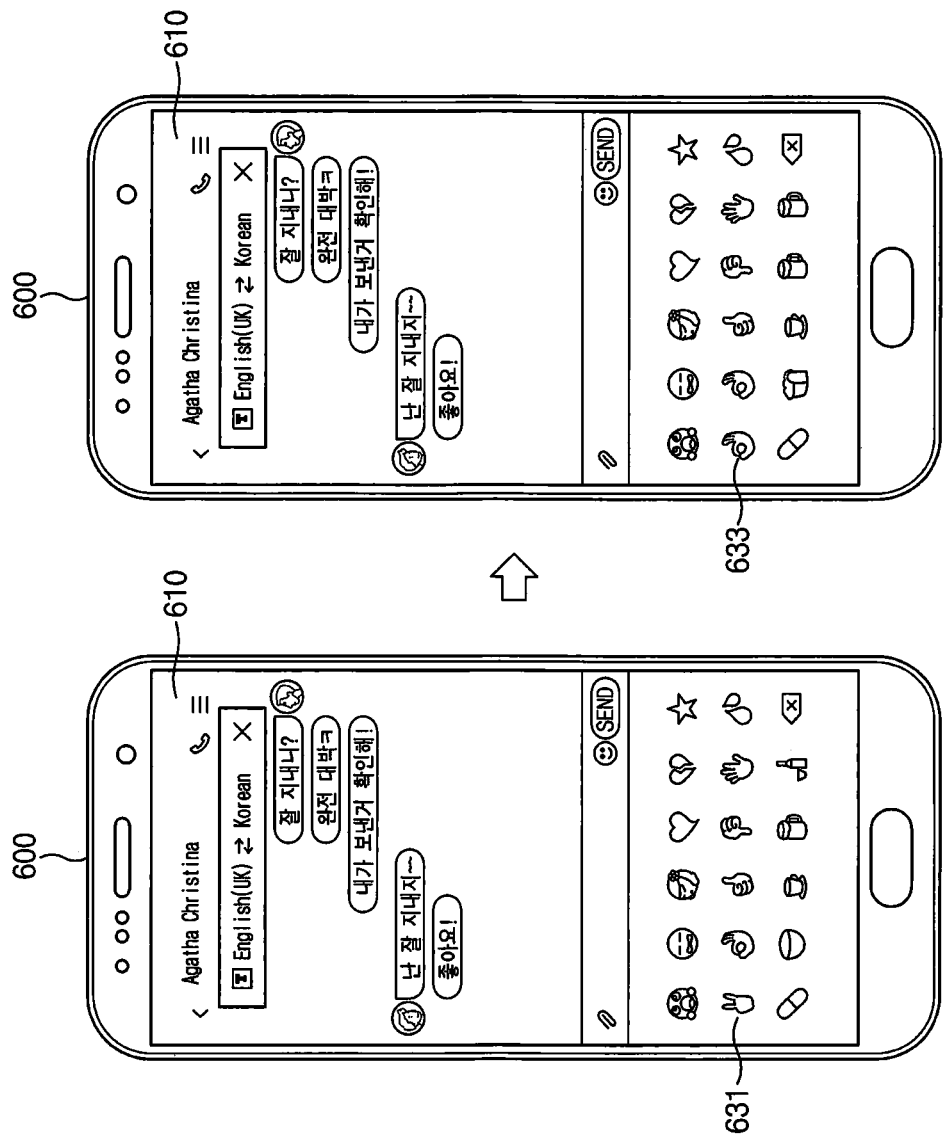
FIG. 6 is a view for describing a method of changing an object having a different meaning according to an embodiment.

FIG. 6 is a view for describing a method of changing an object having a different meaning according to an embodiment.

Referring to FIG. 6, when there is a first object 631 having a different meaning for each region among the objects output on a display 610 (e.g., the display 110), an electronic device 600 (e.g., the electronic device 100) may identify the meaning of which the first object 631 is used in the user's region. Furthermore, the electronic device 600 may change the first object 631 to a second object 633 having the meaning in the region of the counterpart to output the second object 633 to the display 610. For example, when the user tries to transmit the first emoticon (the first object 631) with the first meaning to counterpart, in the case where the first emoticon (the first object 631) is used as the second meaning in the region of the counterpart, the meanings are different, and thus the communication may not be smoothly made. To prevent this, the electronic device 600 may change the first emoticon (the first object 631) into a second emoticon (the second object 633) having the first meaning originally intended by a user in the region of the counterpart.

Figure 7:
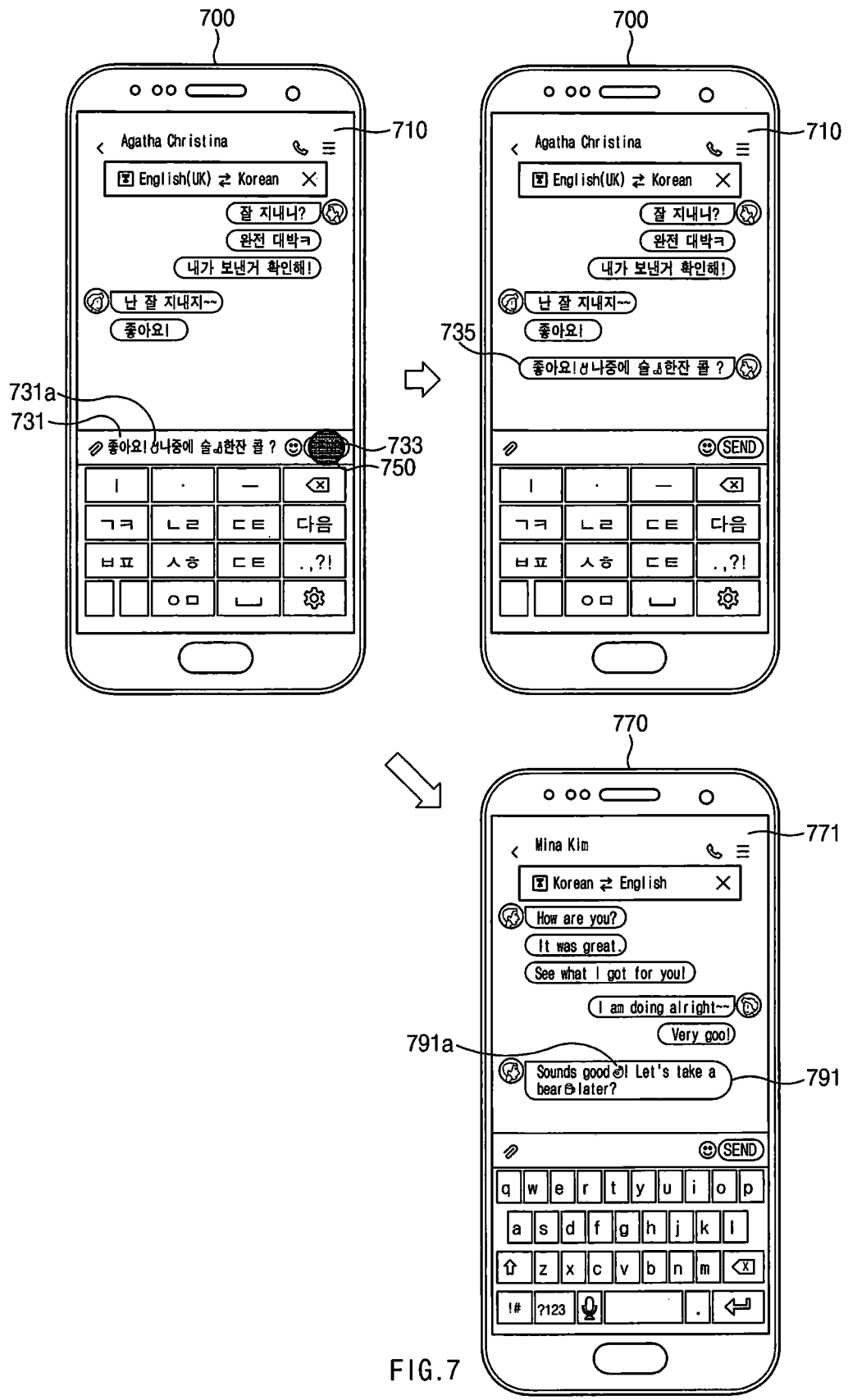
FIG. 7 is a view for describing a method of changing an object upon transmitting an object having a different meaning according to an embodiment.

FIG. 7 is a view for describing a method of changing an object upon transmitting an object having a different meaning according to an embodiment.

Referring to FIG. 7, when there is a first object 731a having a different meaning for each region among the objects output on a display 710 (e.g., the display 110), an electronic device 700 (e.g., the electronic device 100) may identify the meaning of which the first object 731a is used in the user's region. For example, when the user of the electronic device 700 enters a message 731 through a message application, in the case where the first object 731a having a different meaning for each region is present among the objects included in the message 731, the electronic device 700 may identify the meaning of which the first object 731a is used in the user's region.

According to an embodiment, when a button 733 configured to transmit the message 731 to the external electronic device 770 used by the counterpart is selected (750) (e.g., the user input 750 to the button 733 occurs), the electronic device 700 may output the message 735 transmitted to the display 710 while transmitting the message 731 to the external electronic device 770.

According to an embodiment, when transmitting the first object 731a having a different meaning for each region to the counterpart, the electronic device 700 may change and transmit the first object 731a into a second object 791a having the meaning originally intended by the user in the region of the counterpart. For example, when transmitting the message 731 including the first object 731a having a different meaning for each region through a communication circuit (e.g., the communication circuit 170), the electronic device 700 may change and transmit the first object 731a into the second object 791a having the meaning originally intended by the user in the region of the counterpart. In this case, the external electronic device 770 used by the counterpart may output a received message 791 including the second object 791a on the display 771. In this case, the external electronic device 770 may translate and output the received message 791.

Figure 8:
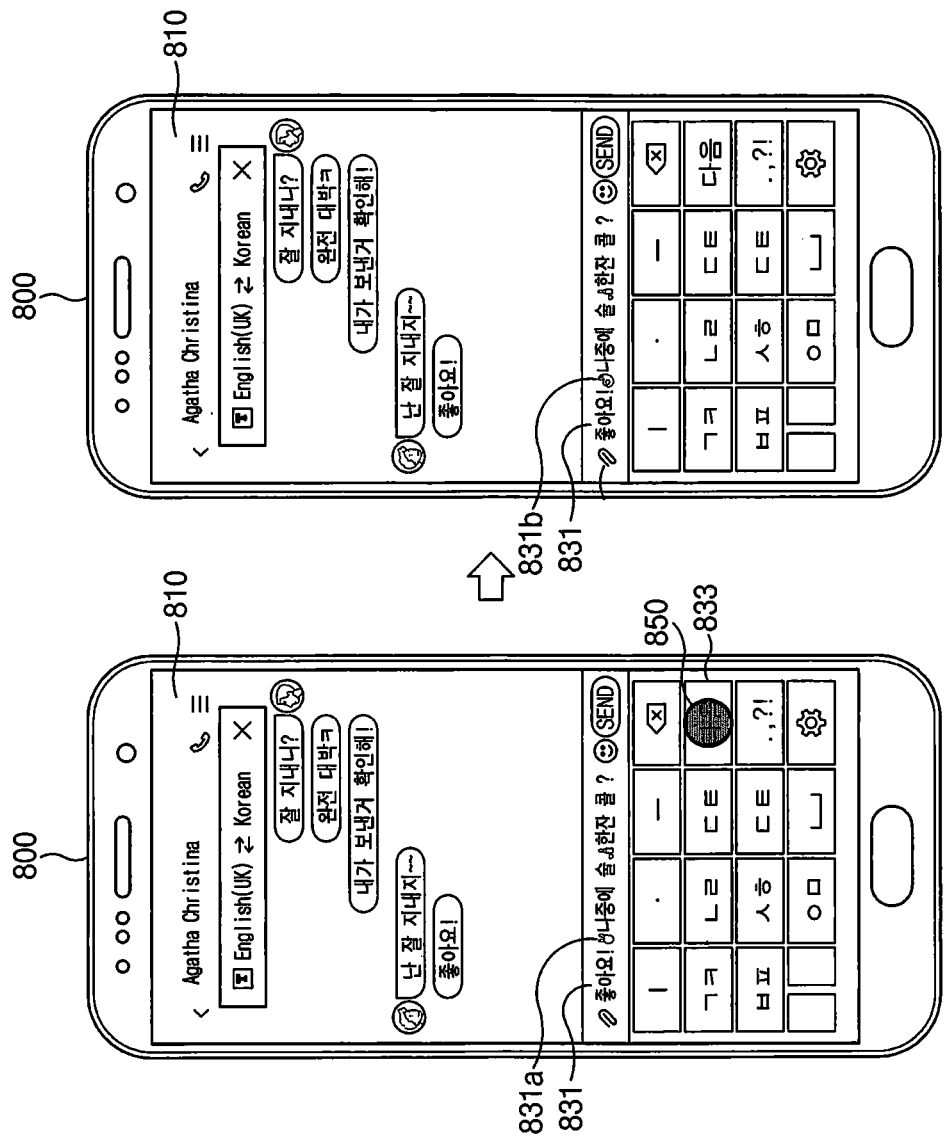
FIG. 8 is a view for describing a method of changing an object upon selecting an object having a different meaning according to an embodiment.

FIG. 8 is a view for describing a method of changing an object upon selecting an object having a different meaning according to an embodiment.

Referring to FIG. 8, when there is a first object 831a having a different meaning for each region among the objects output on a display 810 (e.g., the display 110), an electronic device 800 (e.g., the electronic device 100) may identify the meaning of which the first object 831a is used in the user's region. For example, when the user of the electronic device 800 enters a message 831 through a message application, in the case where the first object 831a having a different meaning for each region is present among the objects included in the message 831, the electronic device 800 may identify the meaning of which the first object 831a is used in the user's region.

According to an embodiment, in the process of entering the message 831, when a button 833 configured to complete the selection of objects (e.g., the first object 831a) is selected (850) (e.g., a user input 850 to the button 833 occurs), the electronic device 800 may identify whether an object (e.g., the first object 831a) having a different meaning for each region is present among the objects included in the message 831. When an object (e.g., the first object 831a)) having different meanings for each region is present, the electronic device 800 may change the object to a second object 831b having a meaning originally intended by a user in the region of the counterpart to output the second object 831b to the display 810. Accordingly, the user may identify the changed objects before transmitting the message 831 to the counterpart.

Figure 9:
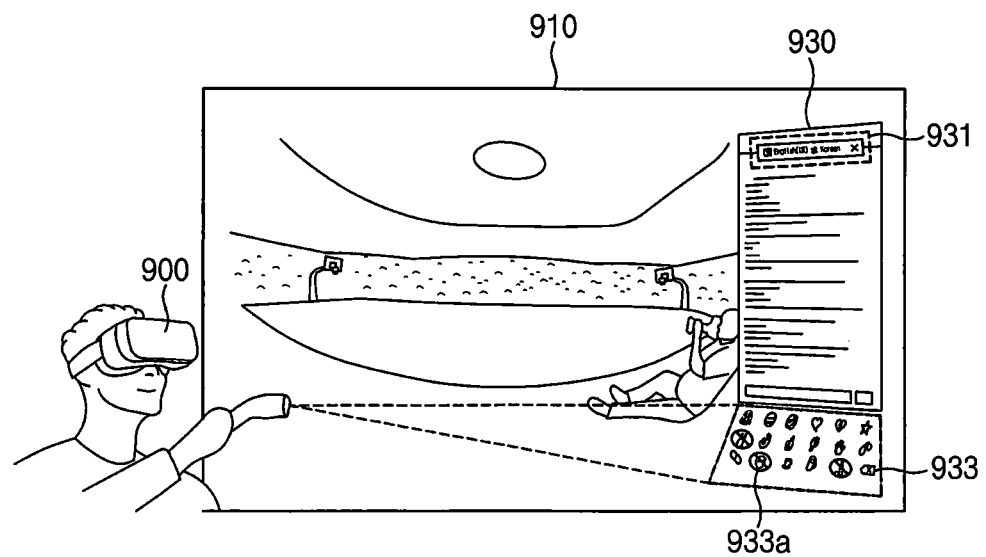
FIG. 9 is a view for describing a screen control method in a VR environment according to an embodiment.

FIG. 9 is a view for describing a screen control method in a VR environment according to an embodiment.

Referring to FIG. 9, a user may communicate with a counterpart through a VR environment. For example, the user may identify an image 910 captured by the counterpart using a camera or the like, through an electronic device 900 (e.g., HMD, or the like). Besides, the user may communicate with the counterpart by providing feedback on the image 910 to the counterpart. For example, the electronic device 900 may provide an interface 930 capable of entering a message in some regions of a screen.

For example, the interface 930 may be a message input screen. Accordingly, the user may provide feedback on the image to the counterpart through the message input screen. The electronic device 900 may include an object 931 associated with a translation function in the interface 930. Moreover, the electronic device 900 may include a region 933 capable of entering an emoticon 933a or a sticker as well as a text, in the interface 930.

Figure 10:
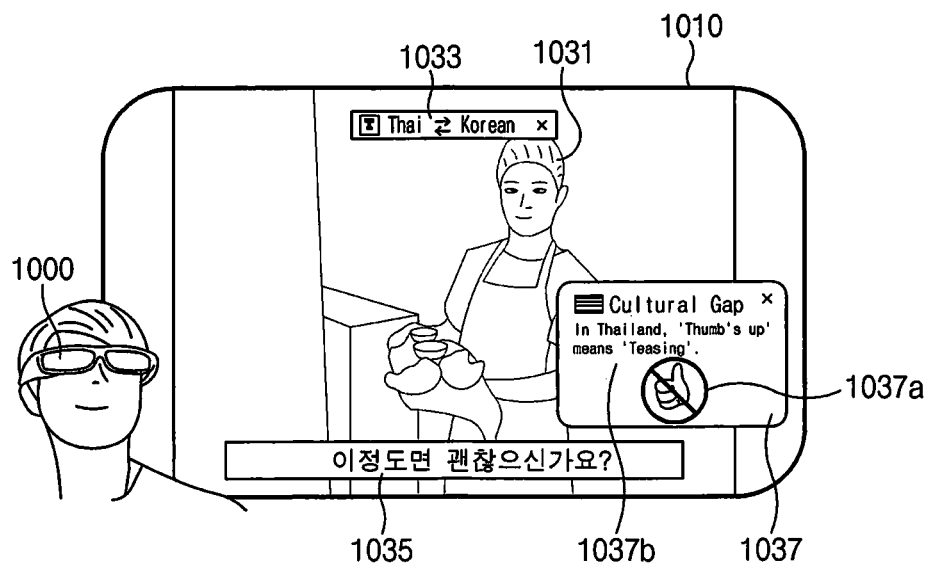
FIG. 10 is a view for describing a screen control method in an AR environment according to an embodiment.

FIG. 10 is a view for describing a screen control method in an AR environment according to an embodiment.

Referring to FIG. 10, a user may communicate with a counterpart through an AR environment. For example, a user may identify a counterpart 1031 and an image 1010 including an object 1033 associated with a translation function, through an electronic device 1000 (e.g., smart glasses, or the like). For example, the electronic device 1000 may analyze the voice uttered by the counterpart 1031 and may output text 1035 (e.g., '이정도면 괜찮으신가요?'='Are you okay now?') translated through the translation function, on the screen. Furthermore, when providing feedback on the text 1035 to the counterpart 1031, the electronic device 1000 may determine whether a gesture 1037a having a different meaning for each region is present. When the gesture 1037a having a different meaning for each region is present among the gestures capable of being performed by the user to the counterpart 1031 as feedback, the electronic device 1000 may output an object 1037 (e.g., a pop-up object) indicating that the gesture 1037a having a different meaning for each region is present in some regions of the screen. For example, the object 1037 may include the gesture 1037a having a different meaning for each region and an object 1037b indicating the meaning of which the gesture 1037a is used in the region of the counterpart.

FIG. 11 is a block diagram illustrating an electronic device 1101 in a network environment 1100 according to various embodiments.

Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally, or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by an other component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

The invention claimed is:

1. An electronic device comprising:
   a display outputting a first object and a second object;
   a memory; and
   a processor,
   wherein the processor is configured to:
      identify a first region set for the electronic device;
      identify a second region of a counterpart;
      determine whether the first region is different from the second region;
      when the first region is different from the second region, identify a first meaning of which the second object is used in the first region and a second meaning of which the second object is used in the second region;
      determine whether the first meaning is different from the second meaning; and
      when the first meaning is different from the second meaning, provide a notification that the first meaning is different from the second meaning, through the display,
   wherein the second object includes at least one of an emotion image, a sticker image, or a gesture image, and
   wherein, as at least part of the identifying of the second region, when the first object includes an image obtained by capturing the counterpart, the processor analyzes the captured image, recognizes a face of the counterpart based on the analysis, identifies the counterpart through the recognized information, and identifies the second region using profile information of the identified counterpart.

2. The electronic device of claim 1, wherein the memory stores information about at least one object having a different meaning for each region.

3. The electronic device of claim 2, wherein the processor is further configured to:
   as at least part of the identifying of the first meaning and the second meaning, identify the information stored in the memory.

4. The electronic device of claim 1, wherein, as at least part of the identifying of the first region, the processor identifies the first region based on at least one of configuration information of the electronic device and profile information about a user of the electronic device.

5. The electronic device of claim 1, wherein a facial feature of the counterpart is determined based on the analysis for determining the second region.

6. The electronic device of claim 1, wherein, as at least part of the providing of the notification, the processor outputs at least one of a text indicating that the first meaning is different from the second meaning or an image indicating that the first meaning is different from the second meaning, to the display.

7. The electronic device of claim 1, wherein the processor changes the second object to a third object indicating usage restriction of the second object or performs transparent processing on the second object.

8. The electronic device of claim 1, wherein the processor ignores a touch input to the second object.

9. The electronic device of claim 1, wherein the processor changes the second object to a third object having the second meaning.

10. The electronic device of claim 1, further comprising:
a communication circuit configured to communicate with an external electronic device of the second region,
wherein, when receiving a user input to transmit the second object to the external electronic device through the communication circuit, the processor changes the second object to a third object having the second meaning and transmits the third object to the external electronic device.

11. A screen controlling method of an electronic device, the method comprising:
identifying a first region set for the electronic device;
identifying a second region of a counterpart;
determining whether the first region is different from the second region;
when the first region is different from the second region, identifying a first meaning of which an object is used in the first region and a second meaning of which a second object is used in the second region;
determining whether the first meaning is different from the second meaning; and
when the first meaning is different from the second meaning, providing a notification that the first meaning is different from the second meaning, through the display,
wherein the object includes at least one of an emotion image, a sticker image, or a gesture image and is output to the display, and
wherein, as at least part of the identifying of the second region, when the counterpart includes an image obtained by capturing the counterpart, the method further comprises analyzing a captured image of the counterpart, determining a facial feature of the counterpart, and determining the second region based on the determined facial feature.

12. An electronic device comprising:
a display outputting a first object and a second object;
a memory; and
a processor,
wherein the processor is configured to:
identify a first region set for the electronic device;
identify a second region of a counterpart;
determine whether the first region is different from the second region;
when the first region is different from the second region, identify a first meaning of which the second object is used in the first region and a second meaning of which the second object is used in the second region;
determine whether the first meaning is different from the second meaning; and
when the first meaning is different from the second meaning, provide a notification that the first meaning is different from the second meaning, through the display,
wherein the second object includes at least one of an emotion image, a sticker image, or a gesture image, and
wherein at least part of the identifying of the second region includes analyzing a voice of the counterpart, determining at least one of a language or a linguistic feature used by the counterpart, and determining the second region based on at least one of the language or the linguistic feature.

13. An electronic device comprising:
a display outputting a first object and a second object;
a memory; and
a processor,
wherein the processor is configured to:
identify a first region set for the electronic device;
identify a second region of a counterpart;
determine whether the first region is different from the second region;
when the first region is different from the second region, identify a first meaning of which the second object is used in the first region and a second meaning of which the second object is used in the second region;
determine whether the first meaning is different from the second meaning; and
when the first meaning is different from the second meaning, provide a notification that the first meaning is different from the second meaning, through the display,
wherein at least part of the identifying of the second region includes analyzing a voice of the counterpart, recognizing the voice of the counterpart based on the analysis, identifying the counterpart through the recognized information, and identifying the second region using profile information of the identified counterpart.

* * * * *